(12) United States Patent
Komatsu et al.

(10) Patent No.: US 7,265,164 B2
(45) Date of Patent: *Sep. 4, 2007

(54) INK COMPOSITION CONTAINING CATIONIC WATER-SOLUBLE POLYMER

(75) Inventors: Hidehiko Komatsu, Nagano-Ken (JP); Kazuhiko Kitamura, Nagano-Ken (JP); Hitoshi Ohta, Nagano-Ken (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,323

(22) Filed: Feb. 23, 1999

(65) Prior Publication Data

US 2002/0177633 A1    Nov. 28, 2002

Related U.S. Application Data

(63) Continuation-in-part of application No. 09/212,960, filed on Dec. 16, 1998, now Pat. No. 6,211,265, and a continuation-in-part of application No. 09/101,496, filed on Dec. 11, 1998, now abandoned, and a continuation-in-part of application No. 09/198,817, filed on Nov. 23, 1998, now Pat. No. 6,100,315, and a continuation-in-part of application No. 09/047,717, filed on Mar. 25, 1998, now Pat. No. 6,720,367.

(30) Foreign Application Priority Data

Feb. 23, 1998   (JP)   .................... 10-040058

(51) Int. Cl.
C09D 11/10   (2006.01)
C08K 3/10    (2006.01)
C08K 3/30    (2006.01)
C08K 3/28    (2006.01)
B41J 2/01    (2006.01)

(52) U.S. Cl. .................. 523/160; 524/395; 524/423; 524/428; 347/105

(58) Field of Classification Search ............... 523/160, 523/161; 106/31.27, 31.28, 31.43, 31.6, 106/31.75; 524/423, 424, 428, 436, 395; 347/105

See application file for complete search history.

(56) References Cited

U.S. PATENT DOCUMENTS

| | | | |
|---|---|---|---|
| 3,686,151 A | 8/1972 | Keim | 528/332 |
| 4,613,525 A | 9/1986 | Miyamoto et al. | 427/256 |
| 4,659,382 A | 4/1987 | Kang | 106/22 |
| 4,680,360 A * | 7/1987 | Ueda et al. | 526/310 |
| 4,789,400 A | 12/1988 | Solodar et al. | |
| 4,962,190 A | 10/1990 | Mayer et al. | 534/573 |
| 5,017,224 A | 5/1991 | Tomita et al. | 106/22 |
| 5,019,164 A | 5/1991 | Tomita et al. | 106/22 |
| 5,223,026 A | 6/1993 | Schwarz, Jr. | 106/20 |
| 5,320,897 A | 6/1994 | Kondo et al. | 428/195 |
| 5,370,731 A | 12/1994 | Yamashita et al. | 106/22 |
| 5,482,545 A | 1/1996 | Aoki et al. | 106/22 |
| 5,503,666 A * | 4/1996 | Mennicke et al. | 106/31.43 |
| 5,555,008 A | 9/1996 | Stoffel et al. | 347/100 |
| 5,618,338 A | 4/1997 | Kurabayashi et al. | 106/26 |
| 5,622,549 A | 4/1997 | Yui et al. | 106/20 |
| 5,624,484 A | 4/1997 | Takahashi et al. | 106/31.75 |
| 5,667,572 A * | 9/1997 | Taniguchi et al. | 106/31.36 |
| 5,693,129 A * | 12/1997 | Lin | 106/31.43 |
| 5,730,789 A * | 3/1998 | Botros | 106/31.43 |
| 5,746,818 A | 5/1998 | Yatake | 106/31.86 |
| 5,769,930 A | 6/1998 | Sano et al. | 106/31.36 |
| 5,781,215 A * | 7/1998 | Onishi et al. | 347/101 |
| 5,805,190 A | 9/1998 | Tsuchii et al. | 347/100 |
| 5,833,744 A | 11/1998 | Breton et al. | 106/31.59 |
| 5,835,116 A | 11/1998 | Sato et al. | 347/98 |
| 5,846,306 A | 12/1998 | Kubota et al. | 106/31.75 |
| 5,861,447 A * | 1/1999 | Nagasawa et al. | 523/161 |
| 5,866,638 A | 2/1999 | Shimomura et al. | 523/16 |
| 5,871,572 A | 2/1999 | Marritt | 106/31.36 |
| 5,948,512 A * | 9/1999 | Kubota et al. | 428/195 |
| 5,985,015 A * | 11/1999 | Kanaya | 106/31.6 |
| 5,997,623 A * | 12/1999 | Lin | 106/31.58 |
| 6,001,899 A * | 12/1999 | Gundlach et al. | 523/160 |
| 6,005,022 A * | 12/1999 | Schwarz, Jr. | 523/160 |
| 6,075,069 A * | 6/2000 | Takemoto | 523/160 |

FOREIGN PATENT DOCUMENTS

EP   0 397 431 A2   5/1990
EP   02296876      12/1990

(Continued)

OTHER PUBLICATIONS

Patent Abstracts of Japan publication No. 64-81871, date of publication Mar. 28, 1989.

(Continued)

Primary Examiner—Callie Shosho
(74) Attorney, Agent, or Firm—Ladas and Parry LLP

(57) ABSTRACT

An ink composition for ink jet recording is provided which can realize both good waterfastness of prints and high-quality recorded images on specialty recording media. The ink composition comprises a water-soluble colorant, such as an acid dye, a cationic water-soluble polymer, such as polyallylamine, and an inorganic salt, such as potassium chloride, in combination.

14 Claims, No Drawings

FOREIGN PATENT DOCUMENTS

| | | |
|---|---|---|
| EP | 434179 A1 | 6/1991 |
| EP | 0528644 | 2/1993 |
| EP | 0567307 | 10/1993 |
| EP | 607445 A1 | 7/1994 |
| EP | 663299 A2 | 7/1995 |
| EP | 675178 A2 | 10/1995 |
| EP | 675179 A2 | 10/1995 |
| EP | 0 776 951 A2 | 5/1997 |
| EP | 0822237 | 2/1998 |
| JP | 56008472 | 1/1981 |
| JP | 60028471 | 2/1985 |
| JP | 62119280 | 5/1987 |
| JP | 62238783 | 10/1987 |
| JP | 63030567 | 2/1988 |
| JP | 63033484 | 2/1988 |
| JP | 63-63764 | 3/1988 |
| JP | 63-215781 | 9/1988 |
| JP | 64-6072 | 1/1989 |
| JP | 64-31877 | 2/1989 |
| JP | 64-81871 | 3/1989 |
| JP | 6481868 | 3/1989 |
| JP | 01152176 | 6/1989 |
| JP | 02080470 | 3/1990 |
| JP | 02255876 | 10/1990 |
| JP | 2-296878 | 12/1990 |
| JP | 02296876 | 12/1990 |
| JP | 02296878 | 12/1990 |
| JP | 04202270 | 7/1992 |
| JP | 05059316 | 3/1993 |
| JP | 05255626 | 10/1993 |
| JP | 07305011 | 11/1995 |
| JP | 0881611 | 3/1996 |
| JP | 08113743 | 5/1996 |
| JP | 8193175 | 6/1996 |
| JP | 9-25442 | 1/1997 |
| JP | 09109547 | 4/1997 |
| JP | 09109548 | 4/1997 |
| JP | 09-151347 | 6/1997 |

OTHER PUBLICATIONS

Patent Abstracts of Japan publication No. 64-6072, date of publication Jan. 10, 1989.
Patent Abstracts of Japan publication No. 2-296878, date of publication Dec. 7, 1990.
Patent Abstracts of Japan publication No. 9-25442, date of publication Jan. 28, 1997.
Patent Abstracts of Japan publication No. 9-151347, date of publication Jun. 10, 1997.
Patent Abstracts of Japan publication No. 63-063764, date of publication Mar. 22, 1988.
Patent Abstracts of Japan publication No. 63-215781, date of publication Sep. 8, 1988.
Translation of Official Action for patent application No. 10-077493 mailed Apr. 12, 2005.
European Patent Specification of EP 0 831 135 B1.
Patent Abstract of Japan of JP56008472 of Jan. 1981.
Patent Abstract of Japan of JP08269375 of Oct. 1996.
Patent Abstract of Japan of JP09020070 of Jan. 1997.
Patent Abstracts of Japan of 60028471 of Feb. 1985.
Patent Abstracts of Japan of 02255876 of Oct. 1990.
Patent Abstracts of Japan of 02296876 of Dec. 1990.
Patent Abstracts of Japan of 02296878 of Dec. 1990.
Patent Abstracts of Japan of 04202270 of Jul. 1992.
Patent Abstracts of Japan of 05255636 of Oct. 1993.
Patent Abstracts of Japan of 05059316 of Mar. 1993.
Patent Abstracts of Japan of 07305011 of Nov. 1995.
Patent Abstracts of Japan of 05255626 of Oct. 1993.
Patent Abstracts of Japan of 63030567 of Feb. 1988.
Patent Abstracts of Japan of 63033484 of Feb. 1988.
Patent Abstracts of Japan of 01152176 of Jun. 1989.
Patent Abstracts of Japan of 02080470 of Mar. 1990.
Patent Abstracts of Japan of 09109547 of Apr. 1997.
Patent Abstracts of Japan of 01081868 of Mar. 1989.
Patent Abstracts of Japan of 09109548 of Apr. 1997.

* cited by examiner

INK COMPOSITION CONTAINING CATIONIC WATER-SOLUBLE POLYMER

This application is a continuation-in-part application of U.S. patent application Ser. Nos. 09/047,717 filed on Mar. 25, 1998, now U.S. Pat. No. 6,720,367, Ser. No. 09/101,496 filed on Dec. 11, 1998, now abandoned Ser. No. 09/198,817 filed on Nov. 23, 1998, now U.S. Pat. No. 6,100,315 and Ser. No. 09/212,960 filed on Dec. 16, 1998 now U.S. Pat. No. 6,211,265.

BACKGROUND OF THE INVENTION

1. Field of the Invention

The present invention relates to an ink composition that can realize good images, especially waterfast images, and more particularly to an ink composition that is preferably used for ink jet recording.

2. Background Art

Ink jet recording is a printing method wherein droplets of an ink are ejected and deposited onto recording media such as paper to conduct printing. According to this method, images having high resolution can be printed at a high speed by means of relatively inexpensive apparatuses. Further, also for color images, sharp, high-quality recorded images can be easily obtained. In recent years, improved waterfastness has been required of images produced on recording paper by ink jet recording, and various combinations of water-soluble cationic resins with anionic dyes have been studied as water-base inks for ink jet recording that can realize waterfast images.

In order to impart waterfastness through addition of a cationic resin to an ink, Japanese Patent Laid-Open No. 119280/1987 discloses an ink comprising a hydroxyethylated polyethyleneimine polymer and a dye component. This publication describes that polyethyleneimine, when used in combination with a direct dye, an acid dye or a reactive dye, can develop waterfastness of the print.

Japanese Patent Laid-Open Nos. 255876/1990, 296878/1990, and 188174/1991 disclose an ink composition comprising a polyamine, with a molecular weight of not less than 300, having a primary amino group, an anionic dye, and a stability-imparting agent, such as urea or thiourea. These publications describe that the combination of the primary amine with the anionic dye can develop waterfastness in the printed ink.

Japanese Patent Laid-Open No. 305011/1995 discloses a water-base ink comprising a basic water-soluble polymer, an anionic dye with the counter ion being a volatile base, and a buffering agent with the counter ion being a volatile base. This publication describes that, in the ink, the volatile base prevents the dissociation of the polymer and, after printing, the volatile base on paper is evaporated to allow a salt-forming reaction between the polymer and the dye to proceed, thereby developing waterfastness.

According to the method wherein a cationic resin is added to an ink containing an anionic dye to impart waterfastness, the development of the waterfastness in printed images is considered attributable to a reaction of an anion of the dye with a cation of the resin on recording media. In the state of ink with a satisfactory amount of water being present therein, both the dye and the resin are in the state of dissolution in the ink. In this system, the equilibrium is significantly leaned toward the state that any precipitate does not occur. On the other hand, after printing, when the ink is dried to some extent to reduce the water content, the equilibrium is significantly leaned toward the state that the dye is reacted with the resin to create a precipitate. This renders the image waterfast.

As compared with inks free from any cationic resin, the above inks poses problems that, in some cases, satisfactory recorded images cannot be produced on specialty recording media such as glossy papers and glossy films, of which recorded images having quality equal to or higher than color photographs are expected. In particular, there are some problems including disappearance or reduction of gloss, lowered color development, lowered ink penetration. To the best knowledge of the present inventors know, the deterioration in images is attributable to the fact that the ink compositions of the above system are significantly influenced by pH and the like on the surface of recording papers.

SUMMARY OF THE INVENTION

The present inventors have found that addition of an inorganic salt to an ink composition containing a cationic resin can realize waterfast, high-quality recorded images. The present invention has been made based on such finding.

Accordingly, an object of the present invention is to provide an ink composition that can realize waterfast, high-quality recorded images.

According to an aspect of the present invention, there is provided an ink composition comprising at least water, a colorant, a cationic water-soluble polymer, and an inorganic salt.

DETAILED DESCRIPTION OF THE INVENTION

The ink composition according to the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink jet recording method.

The ink composition according to the present invention basically contains at least water, a colorant, a cationic water-soluble polymer, and an inorganic salt.

The ink composition according to the present invention can ensure ejection stability of the ink and the waterfastness of prints, while realizing excellent images that have excellent glossiness, color development, and penetration on specialty recording media such as glossy papers and glossy films. Although the reason for this has not been fully elucidated yet, it is believed as follows. It is considered that the anion of the dye is reacted with the cation of the resin to insolubilize the dye, thus leading to the development of waterfastness. For this reason, particularly in printing on specialty recording media or the like, the insolubilization reaction of the dye with the resin is considered to rapidly occur before satisfactory penetration of the ink into the recording medium, due to the influence of pH. This causes the reaction product to accumulate on the surface of the recording medium, which results in lowered image qualities such as disappearance or reduction of gloss and lowered color development. By contrast, according to the ink composition of the present invention, the presence of the inorganic salt in the ink relaxes the reaction of the anion of the dye with the cation of the resin due to buffer action, so that the insolubilization does not occur until the ink satisfactorily penetrates the recording medium and consequently is satisfactorily reduced. For the same reason, the ink composition according to the present invention is considered effective in preventing drying of the ink and clogging of the head as a result of the reaction of the dye with the resin at the front end of the ink jet head. After printing and drying, the resin polymer and the dye are fixed around the surface of the recording medium and insolubilized, while the inorganic salt deeply penetrates the recording medium due to its much smaller size than the dye and the resin polymer and hence does not lower the waterfastness of prints.

(a) Cationic Water-soluble Polymer

In the ink composition according to the present invention, the cationic water-soluble polymer is in the state of dissolution and, after printing, functions to fix the colorant onto the recording medium to impart waterfastness to printed images.

According to a preferred embodiment of the present invention, the cationic water-soluble polymer has in its molecule at least one structure selected from the group consisting of ethyleneimine, allylamine, diallylamine, and dimethylallylamine.

Examples of cationic water-soluble polymers usable herein include homopolymers of polyethyleneimine, polyallylamine, polydiallylamine, and polydimethylallylamine that as such have the above structure alone. Further, besides polymers of primary amines, polymers of secondary, tertiary, and quaternary amines may also be used. Further specific examples of cationic water-soluble polymers usable herein include copolymers including the above structure. Examples of such copolymers include copolymers of the above monomers with acrylamide, hydroxyesters of methacrylic acid, such as hydroxyethyl methacrylate, vinylpyrrolidone, vinyl acetate, acrylic acid, maleic acid, and sulfur dioxide.

According to a preferred embodiment of the present invention, the weight average molecular weight of the cationic water-soluble polymer is preferably about 300 to 20,000, more preferably about 1,000 to 10,000, most preferably about 2,000 to 5,000.

Commercially available cationic water-soluble polymers may also be utilized as the cationic water-soluble resin polymer, and examples thereof include: PAS-J-81 (tradename, manufactured by Nitto Boseki Co., Ltd.), PCQ-1, PAL-2, and PCL-2 (all of which are products of Senka Corp.), Polyfix 601 (tradename, manufactured by Showa High Polymer Co., Ltd.), and Hymax SC-700 (tradename, manufactured by Hymo Corporation); polyethyleneimine derivatives available from Nippon Shokubai Kagaku Kogyo Co., Ltd. under tradename designations Epomin SP-003, SP-006, SP-012, SP-018, SP-103, SP-110, SP-200, and SP-1000; polyallylamine derivatives available under tradename designations PAA-L, PAA-HC1-L, PAA-10C, PAA-CH$_3$COOH-S, and PAA-D11-HCl, polydialylamine derivatives available under the tradename designations PAS-A-1, PAS-A-5, PAS-H-5L, PAS-J-81, PAS-880, PAS-92, PAS-M-1, and PAS-410, and polyallylamine hydrochloride derivatives available under the tradename designations Danfix 723, Danfix 202, Danfix 303, Danfix NK, Danfix F, Danfix 707, Danfix 808, Danfix T, Danfix 505RE, Danfix 5000, Danfix 7000, Danfix PAA, and Danfix HC, all of which are products of Nitto Boseki Co., Ltd. Further, polydimethylallylamine derivatives prepared by dimethylation of the polyallylamine derivatives or by desalting polyallylamine hydrochloride derivatives followed by dimethylation may also be utilized.

These cationic water-soluble polymers may be used alone or as a mixture of two or more.

Although the amount of the cationic water-soluble polymer added is not limited, according to a preferred embodiment of the present invention, the cationic water-soluble polymer in an amount of 0.1 to 20% by weight based on the total amount of the ink composition is preferred. The addition of the cationic water-soluble polymer in the above range can provide better waterfast images and is also advantageous in that the viscosity can be easily modified to a value suitable for application to ink jet recording.

(b) Inorganic Salt

The inorganic salt is preferably present in the state of ionization in the ink. Copresence of the inorganic salt and the cationic water-soluble polymer can realize waterfast, high-quality recorded images.

Examples of preferred inorganic salts usable herein include cations, such as alkali metal ions, alkaline earth metal ions, ammonium ion and silver ion. For anions, halogen ions, sulfate ion and nitrate ion are preferred. Specific examples of preferred inorganic salts include lithium chloride, sodium chloride, potassium chloride, rubidium chloride, cesium chloride, ammonium chloride, barium chloride, calcium chloride, aluminum chloride, magnesium chloride, lithium bromide, sodium bromide, potassium chloride, ammonium bromide, magnesium bromide, lithium iodide, sodium iodide, potassium iodide, ammonium iodide, magnesium iodide, lithium sulfate, sodium sulfate, potassium sulfate, ammonium sulfate, magnesium sulfate, lithium nitrate, sodium nitrate, ammonium nitrate, potassium nitrate, silver nitrate, aluminum nitrate, and magnesium nitrate.

Regarding the inorganic salt, the cation and the anion may be separately added in the production of the ink composition. For example, when potassium hydroxide and hydrochloric acid are separately added to the ink, potassium ion derived from potassium hydroxide and chlorine ion derived from hydrochloric acid are simultaneously present in the ink. This can offer the same effect as attained by the addition of potassium chloride to the ink. Hydroxides of metals, organic acid salts of metals, organic ammonium salts may be added for the addition of the cation. For example, hydroxides of metals usable herein include lithium hydroxide, sodium hydroxide, and potassium hydroxide. Alkali metal salts of organic acids usable herein include disodium adipic acid, sodium L-ascorbate, sodium benzoate, sodium formate, disodium citrate, tripotassium citrate, sodium acetate, potassium acetate, sodium salicylate, disodium oxalate, potassium oxalate, potassium hydrogenoxalate, disodium tartrate, dipotassium tartrate, sodium potassium tartrate, sodium stearate, sodium lactate, disodium phthalate, disodium maleate, and potassium laurate. Organic ammonium salts usable herein include ammonium formate, ammonium acetate, and diammonium oxalate.

The anion for the inorganic salt may be chloride ions derived from the cationic water-soluble polymer added as a hydrochloride.

These inorganic salts may be used alone or as a mixture of two or more.

Although the amount of the inorganic salt added is not limited, it is preferably in the range of 0.5 to 5% by weight based on the ink composition. Addition of the inorganic salt in an amount in the above range can offer a combination of good storage stability of the ink with high-quality recorded images.

(c) Colorant

Colorants are in the state of dissolution in the ink and, after printing, function to provide a plurality of colors onto prints on recording media. Further, according to a preferred embodiment of the present invention, colorants used in the present invention are soluble in alkalis, because these colorants have high color density per weight and can advantageously provide brilliant colors. Alkali-soluble colorants refer to colorants soluble in alkaline media and may be such that the water-soluble group contained in the molecule is an acidic or basic dissociative group or nondissociative functional group, or alternatively a plurality of kinds of these groups are present in the molecule. Alkali-soluble colorants may be soluble in acidic solutions so far as they are soluble in alkalis.

Alkali-soluble colorants have affinity for the cationic water-soluble polymer. On the other hand, since this polymer has high affinity also for paper fibers, the polymer, upon printing, is fixed onto the paper fibers. Further, it is considered that the colorant combines with the polymer to form a water-insoluble salt which is then fixed onto the paper, thus developing waterfastness.

The amount of the colorant added may be suitably determined. The amount, however, is preferably in the range of from 0.5 to 20% by weight based on the total weight of the ink composition. When the amount of the colorant added is in the above range, the ink composition can yield prints having satisfactory optical density and can be advantageously modified to a viscosity suitable for ink jet recording.

Among colorants, dyes refer to organic color materials soluble in water, and preferred dyes are those that fall into categories of acidic dyes, direct dyes, reactive dyes, soluble vat dyes, and food dyes according to the color index. Further, colorants, insoluble in neutral water, falling within categories of oil-soluble dyes and basic dyes according to the color index may also be used so far as they are soluble in aqueous alkali solutions.

On the other hand, pigments are selected from those falling within categories of pigments according to the color index.

Specific examples of dyes and pigments usable herein include:

yellow dyes and pigments, such as C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165, C.I. Direct Yellow 1, 8, 11, 12, 24, 26, 27, 33, 39, 44, 50, 55, 58, 85, 86, 87, 88, 89,98, 110, 132, 142, and 144, C.I. Reactive Yellow 1, 2, 3, 4, 6, 7, 11, 12, 13, 14, 15, 16, 17, 18, 22, 23, 24, 25, 26, 27, 37, and 42, C.I. Food Yellow 3 and 4, C.I. Solvent Yellow 15, 19, 21, 30, and 109, and C.I. Pigment Yellow 23;

red dyes and pigments, such as C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Reactive Red 1, 2, 3, 4, 5, 6, 7, 8, 11, 12, 13, 15, 16, 17, 19,20, 21, 22, 23, 24, 28, 29, 31, 32, 33, 34, 35, 36, 37, 38, 39, 40, 41, 42, 43, 45, 46, 49, 50, 58, 59, 63, and 64, C.I. Solubilized Red 1, C.I. Food Red 7, 9, and 14, and C.I. Pigment Red 41, 48, 54, 57, 58, 63, 68, and 81;

blue dyes and pigments, such as C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249, C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249, C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46, C.I. Solubilized Vat Blue 1, 5, and 41, C.I. Vat Blue 29, C.I. Food Blue 1 and 2, C.I. Basic Blue 9, 25, 28, 29, and 44, and C.I. Pigment Blue 1 and 17; and black dyes and pigments, such as C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191, C.I. Direct Black 17, 19, 22, 32, 38, 51, 56, 62, 71, 74, 75, 77, 94, 105, 106, 107, 108, 112, 113, 117, 118, 132, 133, 146, 154, 168, 171, and 195, C.I. Reactive Black 1, 3, 4, 5, 6, 8, 9, 10, 12, 13, 14, and 18, C.I. Solubilized Vat Black 1, and C.I. Food Black 2.

These colorants may be used alone or as a mixture of two or more.

(d) Water and Other Solvents

Water is a medium for the inks. Water dissolves and holds the colorant, the cationic water-soluble polymer, the inorganic salt, and, optionally, a humectant, and a penetrant.

Water may be pure water obtained by ion exchange, ultrafiltration, reverse osmosis, distillation or the like, or ultrapure water. Further, water, which has been sterilized by ultraviolet irradiation or by addition of hydrogen peroxide, is suitable because, when the ink composition is stored for a long period of time, it can prevent the growth of mold or bacteria.

According to a preferred embodiment of the present invention, the ink composition further comprises a water-soluble organic solvent having a lower vapor pressure than pure water and/or a saccharide as a humectant. Incorporation of the humectant, when the ink composition is used in ink jet recording, can prevent the evaporation of water to maintain the water content. On the other hand, the addition of the water-soluble organic solvent can improve the ejection stability of the ink and can easily modify the viscosity of the ink without changing the properties of the ink.

Examples of preferred water-soluble organic solvents include: polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, and dipropylene glycol; ketones such as acetonylacetone; γ-butyrolactone; esters such as triethyl phosphate; and furfuryl alcohol, tetrahydrofurfuryl alcohol, and thiodiglycol.

Preferred examples of saccharides usable herein include maltitol, sorbitol, gluconolactone, and maltose.

Preferably, the humectant is added in an amount of about 5 to 50% by weight based on the total amount of the ink composition.

The ink composition of the present invention may further comprise a penetrant selected from the group consisting of lower alcohols, cellosolves, carbitols, and nonionic surfactants. The penetrant lowers the surface tension of the ink, accelerates the penetration of the ink into recording media, and shortens the drying time of the ink. Examples of preferred penetrants usable herein include: lower alcohols such as ethanol, isopropanol, butanol, and pentanol; cellosolves such as ethylene glycol monoethyl ether and ethylene glycol monobutyl ether; carbitols such as diethylene glycol monobutyl ether and triethylene glycol monobutyl ether glycol ether; and nonionic surfactants under tradename designations Surfynol 61, 82, 104, 440, 465, and 485 available from Air Products and Chemicals, Inc., and under tradename designations Nissan Nonion K-211, K-220, P-213, E-215, E-220, S-215, S-220, HS-220, NS-212, and NS-220 available from Nippon Oils &. Fats Co., Ltd.

If necessary, the ink composition according to the present invention may further comprise assistants commonly used in water-base inks for ink jet recording.

Examples of assistants usable herein include hydrotropy agents, pH adjustors, antimolds, chelating agents, preservatives, and rust preventives.

Hydrotropy agents usable herein include urea, alkylureas, ethyleneurea, propyleneurea, thiourea, guanidine acid salts, and tetraalkylammonium halides.

Examples of pH adjustors usable herein include: inorganic bases, such as sodium hydroxide, potassium hydroxide, lithium hydroxide, and ammonia; mono-, di-, or tri-lower alkylamines, such as ethylamine, diethylamine, triethylamine, propylamine, dipropylamine, diisopropylamine, tert-butylamine, dibutylamine, diisobutylamine, isopropylamine, sec-butylamine, and pentylamine; lower alkyl lower hydroxyalkoxyamines, such as 3-ethoxypropylamine and 3-methoxypropylamine; lower alkyl lower alkoxyamines, such as 3-ethoxypropylamine and 3-methoxypropylamine; ono-, di-, or tri-lower hydroxyalkylamines, such as 2-aminoethanol, 2-(dimethylamino)ethanol, 2-(diethylamino)ethanol, diethanolamine, N-butyldiethanolamine, triethanolamine, aminomethylpropanol, and triisopropanolamine; and organic amines, such as iminobispropylamine, 3-diethylaminopropylamine, dibutylaminopropylamine, methylaminopropylamine, dimethylaminopropanediamine, and methyliminobispropylamine.

EXAMPLES

Preparation of Cationic Water-soluble Polymers

Preparation 1: Synthesis of polyallylamine

Monoallylamine (286 g) was added dropwise to 550 g of 35% hydrochloric acid under ice cooling with stirring at 5 to 10° C. After the completion of the addition, water and hydrogen chloride were removed at 60° C. using a rotary evaporator under reduced pressure to give white crystals. The crystals were dried at 80° C. under reduced pressure to give 485 g of a monoallylamine hydrochloride. The monoallylamine hydrochloride was brought to a 70% aqueous solution. To the aqueous solution (50 g) was dissolved a radical initiator 2,2'-azobis-(2-amidinopropane) dihydrochloride in an amount of 1% by mole based on the monoallylamine hydrochloride. Further, 25 g of 35% hydrochloric acid was added thereto. Thereafter, the system was subjected to stationary polymerization at 60° C. for 40 hr. After the completion of the polymerization, the system was poured into a mixed solution of acetone (1900 g)/methanol (100 g). The resultant precipitate was filtered to give a polyallylamine hydrochloride.

The polyallylamine hydrochloride was dissolved in ultrapure water to prepare a 10% aqueous solution. The aqueous solution was then passed through an ion exchange resin IRA 900 (tradename, manufactured by Organo Corp.), which had been ion-exchanged with sodium hydroxide to remove hydrochloric acid. Thus, a polyallylamine having a molecular weight of 2,000 was obtained.

Preparation 2: Synthesis of polyallylamine A polyallylamine was prepared in the same manner as in Preparation 1, except that the amount of 2,2'-azobis-(2-amidinopropane) dihydrochloride used was doubled. Thus, a polyallylamine having a molecular weight of 1,500 was obtained.

Preparation 3: Synthesis of poly-(N,N'-dimethylallylamine

A 90% aqueous formic acid solution and 35% formalin were added dropwise in that order to a 25% aqueous solution of the polyallylamine having a molecular weight of 1,500 prepared in Preparation 2 while keeping the temperature of the aqueous polyallylamine solution at 40° C. After the completion of the dropwise addition, the temperature of the system was gradually raised to 90° C. As soon as evolution of carbon dioxide was confirmed, the system was allowed to stand for 6 hr. When the evolution of carbon dioxide ceased, the reaction mixture was poured into acetone to precipitate the reaction product. The precipitate was collected by filtration and dried to prepare poly-(N,N'-dimethylallylamine) having a molecular weight of 2,200.

Ink Compositions and Evaluation Thereof

The following ink compositions were prepared, and properties of the ink compositions were evaluated in terms of waterfastness, storage stability, and glossiness of recorded images.

Evaluation 1: Waterfastness

The ink composition was filled into an ink jet recording printer MJ-5000C (tradename, manufactured by Seiko Epson Corporation) and then printed. Recording media used were neutral plain paper Xerox-P (tradename, manufactured by Fuji Xerox Co., Ltd.), acid plain paper EPP (tradename, manufactured by Seiko Epson Corporation), and recycled paper Xerox-R (tradename, manufactured by Fuji Xerox Co., Ltd.). After the printing, the prints were allowed to stand for one hr and then evaluated for the waterfastness according to a water spotting test set forth in JIS L 0853. Specifically, one drop of water was put on the printed area and allowed to stand until the print dried. The waterfastness was evaluated in terms of a color change (a density lowering) on the printed area. The evaluation criteria were as follows.

A: A color change of less than 15%
B: A color change of 15 to less than 50%
C: A color change of not less than 50%

Evaluation 2: Storage stability

The ink composition was placed in a sample bottle made of glass and allowed to stand at 60° C. for one week and at −30° C. for one week. At the end of this storage period, the ink was inspected for the presence of sediments. The ink (2 cc) after the standing was passed through a filter having a diameter of 1 mm and a pore diameter of 10 µm, and the number of residues on the filter was determined by observation under a microscope (at a magnification of 50 times) to evaluate the storage stability based on the following criteria.

A: Less than 50
B: 50 to 200
C: More than 200

Evaluation 3: Glossiness of recorded images

The above ink composition was filled into an ink jet recording printer MJ-5000C (tradename, manufactured by Seiko Epson Corporation), and images were printed on recording media. The recording media used were specialty glossy paper MJA4SP3 (tradename, manufactured by Seiko Epson Corporation) and specialty glossy film MJA4SP6 (tradename, manufactured by Seiko Epson Corporation). The glossiness of recorded images was evaluated according to the following criteria.

A: Even gloss on the whole image
B: Harsh in part of blotted image
C: Slightly harsh in high color density portion
D: Significantly harsh in image Preparation of Inks

Example 1

Direct Fast Black AB (tradename, manufactured by Sumitomo Chemical Co., Ltd., C.I. Direct Black 32) (5 g) as a colorant was dissolved in 50 g of ultrapure water to prepare a dye solution. The cationic water-soluble polymer synthesized in Preparation 1 (1.5 g) was added to the dye solution with stirring. Thereafter, 2 g of lithium chloride was added thereof, and ultrapure water was then added to a total solution weight of 100 g, followed by stirring. The solution was then passed through a metal mesh filter having a pore diameter of about 5 µm to prepare an ink.

Example 2

Direct Fast Yellow R (tradename, manufactured by Sumitomo Chemical Co., Ltd., C.I. Direct Yellow 50) (2.5 g) as a colorant was dissolved in 50 g of ultrapure water to prepare a dye solution. A polyallylamine PAA-10C (tradename, manufactured by Nitto Boseki Co., Ltd.) as a cationic water-soluble polymer was added in an amount of 1.5% by weight on a solid basis to the dye solution with stirring. Thereafter, 2 g of sodium nitrate was added thereto, and ultrapure water was added to a total solution weight of 100 g, followed by stirring. The solution was then passed through a metal mesh filter having a pore diameter of about 5 µm to prepare an ink.

Example 3

Nippon Fast Red BB (tradename, manufactured by Sumitomo Chemical Co., Ltd., C.I. Direct Red 31) as a colorant (2 g) was dissolved in 50 g of ultrapure water to prepare a dye solution. A polyethyleneimine SP-012 (tradename, manufactured by Nippon Shokubai Kagaku Kogyo Co., Ltd.) (4 g) as a cationic water-soluble polymer was added to the dye solution with stirring. Lithium sulfate (1 g) was then added. Ultrapure water was added to a total solution weight of 100 g, followed by stirring. The solution was then passed through a metal mesh filter having a pore diameter of about 5 µm to prepare an ink.

Example 4

Kayarus Turquoise Blue GL (tradename, manufactured by Nippon Kayaku Co., Ltd., C.I. Direct Blue 86) (4 g) as a colorant was dissolved in 50 g of ultrapure water to prepare a dye solution. The cationic water-soluble polymer synthesized in Preparation 3 (3 g) was added to the dye solution with stirring. Thereafter, 3 g of potassium chloride was added thereof, and ultrapure water was then added to a total solution weight of 100 g, followed by stirring. The solution was then passed through a metal mesh filter having a pore diameter of about 5 µm to prepare an ink.

The inks prepared in Examples 1 to 4 were evaluated for waterfastness of prints, storage stability of inks, and glossiness of recorded images. The results were as summarized in the following table.

|  | Waterfastness | Storage stability | Glossiness |
| --- | --- | --- | --- |
| Ex. 1 | A | A | A |
| Ex. 2 | A | A | B |
| Ex. 3 | A | B | B |
| Ex. 4 | A | A | A |

Example 5

An ink was prepared in the same manner as in Example 1, except that the colorant was changed to 3 g of Nigrosine NB (tradename, manufactured by Sumitomo Chemical Co., Ltd., C.I. Acid Black 2) and the cationic water-soluble polymer was changed to 2.5% by weight on a solid basis of a copolymer of a diallylamine with sulfur dioxide, PAS-A-1 (tradename, manufactured by Nitto Boseki Co., Ltd.), and the inorganic salt was changed to 0.7 g of magnesium nitrate.

Example 6

An ink was prepared in the same manner as in Example 1, except that the colorant was changed to 3.5 g of Mikethren Soluble Blue O (tradename, manufactured by Mitsui Toatsu Chemicals, Inc., C.I. Solubilized Vat Blue 1) and the amount of the poly-(N,N'-dimethylallyamine) with a molecular weight of about 2,200 synthesized in Preparation 3 was changed to 1.5 g.

Example 7

An ink was prepared in the same manner as in Example 1, except that the colorant was changed to 2 g of Sumifix Brilliant Blue R (tradename, manufactured by Sumitomo Chemical Co., Ltd., C.I. Reactive Blue 19), the cationic water-soluble polymer was changed to 2.5% by weight on a solid basis of a polyallylamine PAA-L (tradename, manufactured by Nitto Boseki Co., Ltd.), and the inorganic salt was changed to 1.5 g of potassium chloride.

Example 8

An ink was prepared in the same manner as in Example 1, except that the colorant was changed to 2.5 g of Food Yellow No. 5 (tradename, manufactured by Hodogaya Chemical Co., Ltd., C.I. Food Yellow 3), the cationic water-soluble polymer was changed to 3 g of the polymer synthesized in Preparation 3, 1.7 g of lithium hydroxide was used as a hydroxide of an alkali metal, and 7.38 g of 35% hydrochloric acid was added. In this example, 3 g of lithium chloride is present as an inorganic salt in the ink.

Example 9

An ink was prepared in the same manner as in Example 1, except that the colorant was changed to 2 g of Aizen Methylene Blue FZ (tradename, manufactured by Hodogaya Chemical Co., Ltd., C.I. Basic Blue 9), the cationic water-soluble polymer was changed to 2% by weight on a solid basis of a polyallylamine PAA-10C (tradename, manufactured by Nitto Boseki Co., Ltd.), and the inorganic salt was changed to 2 g of sodium chloride.

Example 10

An ink was prepared in the same manner as in Example 1, except that the colorant was changed to 2.5 g of Zapon Fast Yellow CGG (tradename, manufactured by BASF, C.I. Solvent Yellow 15) and the cationic water-soluble polymer was changed to 1.5% by weight on a solid basis of a copolymer of diallyldimethylamine with acrylamide, PAS-J-81 (tradename, manufactured by Nitto Boseki Co., Ltd.).

Example 11

An ink was prepared in the same manner as in Example 1, except that the colorant was changed to 2.5 g of Pink 6G (tradename, manufactured by Nomakagaku Kogyo K.K., C.I. Pigment Red 81), the cationic water-soluble polymer was changed to 2% by weight on a solid basis of a polyallylamine hydrochloride, Danfix 723 (tradename, manufactured by Nitto Boseki Co., Ltd.), and 1.2 g of potassium hydroxide was used instead of lithium chloride. In this example, 1.6 g of potassium chloride is present as an inorganic salt in the ink.

The inks prepared in Examples 5 to 11 were evaluated for waterfastness of prints, storage stability of inks, and glossiness of recorded images. The results were summarized in the following table.

|       | Waterfastness | Storage stability | Glossiness |
|-------|---------------|-------------------|------------|
| Ex. 5 | A | B | A |
| Ex. 6 | B | A | B |
| Ex. 7 | A | A | A |
| Ex. 8 | B | A | A |
| Ex. 9 | A | B | A |
| Ex. 10 | A | B | A |
| Ex. 11 | A | B | B |

The above results show that, for the colorant, not only water-soluble acid dyes, direct dyes, reactive dyes, soluble vat dyes, food dyes, or basic dyes, but also water-insoluble oil dyes or pigments so far as they are soluble in alkalis, can provide good inks.

Example 12

An ink was prepared in the same manner as in Example 1, except that the amount of Direct Fast Black AB used was changed to 0.5 g, the cationic water-soluble polymer was changed to 0.5 g of the polymer synthesized in Preparation 3, and the amount of lithium chloride used was changed to 0.6 g.

Example 13

An ink was prepared in the same manner as in Example 1, except that the amount of Direct Fast Black AB used was changed to 10 g and the cationic water-soluble polymer was changed to 10 g of a polyethyleneimine SP-012 (tradename, manufactured by Nippon Shokubai Kagaku Kogyo Co., Ltd.).

Example 14

An ink was prepared in the same manner as in Example 1, except that the amount of Direct Fast Black AB used was changed to 20 g, the cationic water-soluble polymer was changed to 15 g of the polymer synthesized in Preparation 3, and the amount of lithium chloride added was changed to 4 g.

The inks prepared in Examples 12 to 14 were evaluated for waterfastness of prints, storage stability of inks, and glossiness of recorded images. The results were as summarized in the following table.

|       | Waterfastness | Storage stability | Glossiness |
|-------|---------------|-------------------|------------|
| Ex. 12 | A | A | A |
| Ex. 13 | A | A | B |
| Ex. 14 | B | B | B |

Example 15

An ink was prepared in the same manner as in Example 1, except that the cationic water-soluble polymer was changed to 2.5 g of a polyethyleneimine SP-012 (tradename, manufactured by Nippon Shokubai Kagaku Kogyo Co., Ltd.).

Example 16

An ink was prepared in the same manner as in Example 1, except that lithium chloride was changed to 2 g of potassium hydroxide and 3.72 g of 35% hydrochloric acid. In this example, 2.66 g of potassium chloride is present as an inorganic salt in the ink.

Example 17

An ink was prepared in the same manner as in Example 1, except that the cationic water-soluble polymer was changed to 1.2% by weight on a solid basis of a polyallylamine hydrochloride, Danfix 723 (tradename, manufactured by Nitto Boseki Co., Ltd.), and 0.3 g of lithium hydroxide was used instead of lithium chloride. In this example, 0.53 g of lithium chloride is present as an inorganic salt in the ink.

Example 18

An ink was prepared in the same manner as in Example 1, except that the cationic water-soluble polymer was changed to 3% by weight on a solid basis of a polyallylamine hydrochloride, Danfix 723 (tradename, manufactured by Nitto Boseki Co., Ltd.), and 1.25 g of sodium hydroxide was used instead of lithium chloride. In this example, 1.83 g of sodium chloride is present as an inorganic salt in the ink.

Example 19

An ink was prepared in the same manner as in Example 1, except that the cationic water-soluble polymer was changed to 2% by weight on a solid basis of a polyallylamine PAA-L (tradename, manufactured by Nitto Boseki Co., Ltd.)

The inks prepared in Examples 15 to 19 were evaluated for waterfastness of prints, storage stability of inks, and glossiness of recorded images. The results were as summarized in the following table.

|  | Waterfastness | Storage stability | Glossiness |
|---|---|---|---|
| Ex. 15 | B | A | A |
| Ex. 16 | A | A | A |
| Ex. 17 | A | A | B |
| Ex. 18 | A | A | A |
| Ex. 19 | B | A | B |

The above results show that a cationic water-soluble polymer having in its molecule at least a structure selected from ethyleneimine, dimethylallylamine, allylamine, and diallylamine, independently of whether or not it is a homopolymer or a copolymer, can provide good inks.

Example 20

An ink was prepared in the same manner as in Example 1, except that the amount of Direct Fast Black AB was changed to 0.5 g, the cationic water-soluble polymer was changed to 0.1% by weight on a solid basis of a polydiallylamine PAS-H-5L (tradename, manufactured by Nitto Boseki Co., Ltd.), and 2 g of 2-(dimethylamino)ethanol was further added thereto.

Example 21

An ink was prepared in the same manner as in Example 1, except that the amount of ultrapure water was changed to 30 g, the amount of Direct Fast Black AB was changed to 3 g, the amount of the cationic water-soluble polymer was changed to 10% by weight on a solid basis of a polyallylamine PAA-10C (tradename, manufactured by Nitto Boseki Co., Ltd.), and lithium chloride was changed to 1.3 g of sodium hydroxide and 3.39 g of 35% hydrochloric acid. In this example, 1.9 g of sodium chloride is present as an inorganic salt in the ink.

Example 22

An ink was prepared in the same manner as in Example 1, except that the amount of ultrapure water was changed to 30 g, the amount of Direct Fast Black AB was changed to 5 g, and the cationic water-soluble polymer was changed to 20 g of a polyethyleneimine, Epomin SP-003 (tradename, manufactured by Nippon Shokubai Kagaku Kogyo Co., Ltd.).

The inks prepared in Examples 20 to 22 were evaluated for waterfastness of prints, storage stability of inks, and glossiness of recorded images. The results were as summarized in the following table.

|  | Waterfastness | Storage stability | Glossiness |
|---|---|---|---|
| Ex. 20 | A | A | A |
| Ex. 21 | A | A | A |
| Ex. 22 | A | B | B |

The results of Examples 8, 16, and 21 show that addition of a cation for an inorganic salt as a hydroxide of an alkali metal provides good inks. Further, the results of Examples 11, 17, and 18 show that also when an anion for an inorganic salt is a chloride ion added as a hydrochloride of a cationic water-soluble resin polymer, good inks can be obtained.

Example 23

An ink was prepared in the same manner as in Example 1, except that the colorant was changed to 1.0 g of Kayarus Turquoise Blue GL (tradename, manufactured by Nippon Kayaku Co., Ltd., C.I. Direct Blue 86) and the inorganic salt was changed to 0.5 g of potassium chloride.

Example 24

An ink was prepared in the same manner as in Example 1, except that the colorant was changed to 4.0 g of Kayarus Turquoise Blue GL (tradename, manufactured by Nippon Kayaku Co., Ltd., C.I. Direct Blue 86) and the inorganic salt was changed to 3.0 g of potassium chloride.

Example 25

An ink was prepared in the same manner as in Example 1, except that the colorant was changed to 6.0 g of Kayarus Turquoise Blue GL (tradename, manufactured by Nippon Kayaku Co., Ltd., C.I. Direct Blue 86) and the inorganic salt was changed to 5.0 g of potassium chloride.

The inks prepared in Examples 23 to 25 were evaluated for waterfastness of prints, storage stability of inks, and glossiness of recorded images. The results were as summarized in the following table.

|  | Waterfastness | Storage stability | Glossiness |
|---|---|---|---|
| Ex. 23 | A | A | B |
| Ex. 24 | A | A | A |
| Ex. 25 | A | A | A |

Example 26

An ink was prepared in the same manner as in Example 1, except that 10 g of glycerin was added as a humectant.

Example 27

An ink was prepared in the same manner as in Example 1, except that 10 g of maltitol was added as a humectant.

Example 28

An ink was prepared in the same manner as in Example 1, 10 g of thiodiglycol was further added as a humectant.

The inks prepared in Examples 26 to 28 were evaluated for waterfastness of prints, storage stability of inks, and glossiness of recorded images. The results were as summarized in the following table.

|  | Waterfastness | Storage stability | Glossiness |
|---|---|---|---|
| Ex. 26 | A | A | A |
| Ex. 27 | A | A | A |
| Ex. 28 | A | A | A |

Example 29

An ink was prepared in the same manner as in Example 1, except that the amount of Direct Fast Black AB was changed to 4 g, the cationic water-soluble polymer was changed to 2.5% by weight on a solid basis of a polyallylamine hydrochloride, Danfix 723 (tradename, manufactured by Nitto Boseki Co., Ltd.), lithium chloride was changed to 1.5 g of potassium hydroxide, and, in addition, 5 g of 2-(dimethylamino)ethanol and 10 g of diethylene glycol monobutyl ether as a penetrant were added. In this example, 2 g of potassium chloride is present as an inorganic salt in the ink.

Example 30

An ink was prepared in the same manner as in Example 1, except that the amount of Direct Fast Black AB was changed to 4 g, the cationic water-soluble polymer was changed to 3.5% by weight on a solid basis of a copolymer of a diallylamine with sulfur dioxide, PAS-A-1 (tradename, manufactured by Nitto Boseki Co., Ltd.), and, in addition, 4 g of 2-(dimethylamino)ethanol and 0.8 g of a surfactant, Surfynol 465 (tradename, manufactured by Air Products and Chemicals, Inc.), as a penetrant were added.

Example 31

An ink was prepared in the same manner as in Example 1, except that the amount of Direct Fast Black AB was changed to 6 g, 10 g of glycerin was used as a humectant, and, in addition, 10 g of diethylene glycol monobutyl ether and 0.8 g of a nonionic surfactant, Surfynol 465 (tradename, manufactured by Air Products and Chemicals, Inc.) were added as a penetrant.

The inks prepared in Examples 29 to 31 were evaluated for waterfastness of prints, storage stability of inks, and glossiness of recorded images. The results were as summarized in the following table.

|  | Waterfastness | Storage stability | Glossiness |
| --- | --- | --- | --- |
| Ex. 29 | A | A | A |
| Ex. 30 | A | A | A |
| Ex. 31 | A | A | A |

A blotted image was printed, using the inks prepared in Examples 29 to 31, on a neutral plain paper Xerox-P (tradename, manufactured by Fuji Xerox Co., Ltd.), acid plain paper EPP (tradename, manufactured by Seiko Epson Corporation), and recycled paper Xerox-R (tradename, manufactured by Fuji Xerox Co., Ltd.). As a result, for all the papers, the drying time taken for the ink on the paper to penetrate, from surface into interior of the paper, and disappear was less than 2 sec, indicating that these inks were quick-drying, drying, ultrahigh penetrative inks.

Comparative Example 1

An ink was prepared in the same manner as in Example 1, except that lithium chloride as the inorganic salt was not added.

Comparative Example 2

An ink was prepared in the same manner as in Example 8, except that lithium hydroxide was not added.

Comparative Example 3

An ink was prepared in the same manner as in Example 1, except that the cationic polymer was not added and the amount of ultrapure water was changed to 51.5 g.

The inks prepared in Comparative Examples 1 to 3 were evaluated for waterfastness of prints, storage stability of inks, and glossiness of recorded images. The results were as summarized in the following table.

|  | Waterfastness | Storage stability | Glossiness |
| --- | --- | --- | --- |
| Comp. Ex. 1 | A | A | D |
| Comp. Ex. 2 | A | A | C |
| Comp. Ex. 3 | C | B | A |

What is claimed is:

1. An ink jet recording method comprising the steps of:
    (a) providing a recording medium having a glossiness, said recording medium being one wherein, upon formation of a printed image on the recording medium with an ink consisting of an alkali-soluble colorant, a cationic water-soluble polymer and water, the formed image exhibits an uneven gloss, said recording medium being selected from the group consisting of a gloss paper and a gloss film;
    (b) providing an ink composition comprising the alkali-soluble colorant, the cationic water-soluble polymer, water and an inorganic salt; said alkali-soluble colorant being in a state of dissolution in the ink composition, said inorganic salt being a salt of an alkali metal, said alkali-soluble colorant, cationic water-soluble polymer, water and inorganic salt being present in the ink composition in respective amounts effective to enable formation on the recording medium, upon deposition of the ink composition, of a printed image that exhibits an even gloss on the whole image, with the caveat that the inorganic salt cannot be present in an amount outside of a range of 0.5 to 5% by weight; and
    (c) ejecting droplets of the ink composition onto the recording medium to print an image thereon that has an even gloss.

2. The method according to claim 1, wherein the inorganic salt is contained in an ionized state in the ink composition.

3. The method according to claim 1, wherein the inorganic salt is formed with an inorganic salt-forming cation that is added as a hydroxide of an alkali metal to the ink composition.

4. The method according to claim 1, wherein the inorganic salt is formed with an anion, which forms the inorganic salt, that is a chloride ion derived from the cationic water-soluble polymer that has been added as a hydrochloride.

5. The method according to claim 1, wherein the colorant is an organic dye or pigment.

6. The method according to claim 1, wherein the colorant is contained in an amount in the range of 0.5 to 20% by weight.

7. The method according to claim 1, wherein the cationic water-soluble polymer is formed by polymerizing at least one monomer selected from the group consisting of ethyleneimine, allylamine, diallylamine, and dimethylallylamine.

8. The method according to claim 1, wherein the cationic water-soluble polymer is contained in an amount in the range of 0.1 to 20% by weight.

9. The method according to claim 1, wherein the ink composition further comprises a water-soluble organic solvent andlor a saccharide having a lower vapor pressure than pure water as a humectant.

10. The method according to claim 1, wherein the ink composition further comprises at least one penetrant selected from the group consisting of lower alcohols, cellosolves, carbitols, and nonionic surfactants.

11. A record printed by the method according to claim 1.

12. The method according to claim 1, wherein the alkali-soluble colorant, the cationic water-soluble polymer, the inorganic salt and the water are present in the ink composition in respective amounts such that, when the ink composition is stored in a glass bottle at 60° C. for one week and at −30° C. for one week and is then passed through a filter having a diameter of 1 mm and a pore diameter of 10 μm, there are fewer than 50 residues on the filter when observed under a microscope at a magnification of 50 times.

13. An ink jet recording method comprising the steps of:
(a) providing a recording medium having a glossiness, said recording medium being one wherein, upon formation of a printed image on the recording medium with an ink consisting of an alkali-soluble colorant, a cationic water-soluble polymer and water, the formed image exhibits an uneven gloss, said recording medium being selected from the group consisting of a gloss paper and a gloss film;
(b) providing an ink composition comprising the alkali-soluble colorant, the cationic water-soluble polymer, water and an inorganic salt; said alkali-soluble colorant being in a state of dissolution in the ink composition, said inorganic salt being a salt of an alkali metal, wherein the inorganic salt is formed (i) with an inorganic salt-forming cation that is added as a hydroxide of an alkali metal to the ink composition or (ii) with an anion that is a chloride ion derived from the cationic water-soluble polymer that has been added as a hydrochloride, said alkali-soluble colorant, cationic water-soluble polymer, water and inorganic salt being present in the ink composition in respective amounts effective to enable formation on the recording medium, upon deposition of the ink composition, of a printed image that exhibits an even gloss on the whole image,
(c) ejecting droplets of the ink composition onto the recording medium to print an image thereon that has an even gloss.

14. The method according to claim 13, wherein the alkali-soluble colorant, the cationic water-soluble polymer, the inorganic salt and the water are present in the ink composition in respective amounts such that, when the ink composition is stored in a glass bottle at 60° C. for one week and at −30° C. for one week and is then passed through a filter having a diameter of 1 mm and a pore diameter of 10 μm, there are fewer than 50 residues on the filter when observed under a microscope at a magnification of 50 times.

* * * * *